(12) United States Patent
Wang et al.

(10) Patent No.: US 8,508,827 B2
(45) Date of Patent: Aug. 13, 2013

(54) VIBRATION-ACTUATED MICRO MIRROR DEVICE

(71) Applicants: Yu-Jen Wang, Taipei County (TW);
Chien-Shien Yeh, Tainan County (TW);
Chung-De Chen, Miaoli County (TW);
Hung-Chung Li, Hualien County (TW)

(72) Inventors: Yu-Jen Wang, Taipei County (TW);
Chien-Shien Yeh, Tainan County (TW);
Chung-De Chen, Miaoli County (TW);
Hung-Chung Li, Hualien County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 0 days.

(21) Appl. No.: 13/667,093

(22) Filed: Nov. 2, 2012

(65) Prior Publication Data

US 2013/0057936 A1    Mar. 7, 2013

Related U.S. Application Data

(60) Division of application No. 12/963,024, filed on Dec. 8, 2010, now Pat. No. 8,218,214, and a continuation-in-part of application No. 13/450,574, filed on Apr. 19, 2012, now Pat. No. 8,325,405.

(30) Foreign Application Priority Data

Aug. 17, 2010    (TW) .............................. 99127428 A

(51) Int. Cl.
*G02B 26/08*    (2006.01)

(52) U.S. Cl.
USPC .................. 359/224.1; 359/198.1; 359/199.4; 359/200.8

(58) Field of Classification Search
USPC .......... 359/198.1–200.8, 221.2, 224.1–224.2; 310/36, 40 R, 309, 311, 321
See application file for complete search history.

(56) References Cited

U.S. PATENT DOCUMENTS 5,579,148 A    11/1996    Nishikawa et al.
6,956,683 B2    10/2005    Heaton et al.
(Continued)

FOREIGN PATENT DOCUMENTS

| TW | 517154 | 1/2003 |
|---|---|---|
| TW | 594007 | 6/2004 |
| TW | 201107038 | 3/2011 |

OTHER PUBLICATIONS

Yalcinkaya et, al., "Two-Axis Electromagnetic Microscanner for High Resolution Displays", Aug. 2006, pp. 786-794, vol. 15, Journal of Microelectromechanical Systems.

(Continued)

*Primary Examiner* — James Phan
(74) *Attorney, Agent, or Firm* — WPAT, PC; Justin King

(57) ABSTRACT

A vibration-actuated micro mirror device comprises a substrate, a swinging frame, a reflection mirror, and a vibration part. The swinging frame is rotatably arranged within a first accommodating space formed on the substrate. The reflection mirror is rotatably arranged within a second accommodating space formed on the swinging frame. The vibration part further comprises a plate coupled to the substrate, and a first and a second vibration structures. The first and the second vibration structures are coupled to the plate and are spaced a distance away from each other, wherein the first vibration structure receives a first driving signal having a first frequency and the second vibration structure receives a second driving signal having a second frequency smaller than the first frequency, thereby enabling the swinging frame to rotate about the first axis while enabling the reflection mirror to rotate about the second axis.

19 Claims, 10 Drawing Sheets

(56) References Cited

U.S. PATENT DOCUMENTS

| | | |
|---|---|---|
| 6,965,177 B2 | 11/2005 | Turner et al. |
| 6,979,418 B1 | 12/2005 | Harrington |
| 7,377,439 B1 | 5/2008 | Merchant |
| 7,442,918 B2 | 10/2008 | Sprague et al. |
| 7,446,919 B2 | 11/2008 | Wood |
| 7,605,965 B2 * | 10/2009 | Tani et al. ............ 359/224.1 |
| 7,659,918 B2 | 2/2010 | Turner |
| 2008/0042052 A1 | 2/2008 | Sprague et al. |
| 2012/0218612 A1 * | 8/2012 | Chang et al. ............ 359/199.4 |

OTHER PUBLICATIONS

R. Maeda et, al., "Piezoelectric Microactuator Devices", 2004, Journal of Electroceramics, Kluwer Academic Publishers, Manufactured in The Netherlands.

Gruger et, al., "New Approach for MEMS Scanning Mirror for Laser Projection Systems", 2008, vol. 6887, Proc. of SPIE, Retrieved from the Internet: <URL:http://spiedl.org/terms>.

* cited by examiner

VIBRATION-ACTUATED MICRO MIRROR DEVICE

CROSS-REFERENCE TO RELATED APPLICATION

The present application is a continuation-in-part of U.S. patent application Ser. No. 13/450,574, filed on Apr. 19, 2012, now U.S. Pat. No. 8,325,405, which is a divisional application of U.S. patent application Ser. No. 12/963,024, filed on Dec. 8, 2010, now U.S. Pat. No. 8,218,214, which claims priority from Taiwan Patent Application No. 099127428 filed in the Taiwan Patent Office on Aug. 17, 2010, the entire disclosures of which are incorporated herein by reference.

TECHNICAL FIELD

The present disclosure relates to a micro mirror technology, and more particularly, to a vibration-actuated micro mirror device.

BACKGROUND

With rapidly increasing demand for micro projectors, there are more and more manufacturers that are directing their resources and funding toward the related researches in order to establishing a leading position in this promising and profitable technology. It is noted that micro projectors can be integrated into all kinds of electronic devices, such as cellular phones and notebook computers. By a modularization design of micro projector, any cellular phone can be equipped with a projector module and thus can be used in briefing easily and conveniently that is comparatively much more capable of attracting consumer interest than those without. Most micro projectors that are currently available on the market are flat in appearance, and consequently, all the components used in micro projectors are designed solely for reducing the thickness of the micro projectors, by that not only the flat and thin micro projectors can be portable, but also can be easily integrated with other products.

One of the key issues for producing a good micro projector is to have a refection mirror that can be driven to rotate within a large angular range and at high rotation frequency. For a XGA projector displaying a resolution of 800 pixels by 600 pixels to achieve 30 frames per second, its fast axis must be capable operating at 18 kHz or higher, and the faster the better. Conventionally, there are three different methods for actuating reflection mirrors in micro projectors, which are an electromagnetic-actuated method, an electrostatic-actuated method and a piezoelectric-actuated method, and accordingly, the reflection mirror should be configured differently in corresponding to the way it is being actuated.

In U.S. Pat. No. 7,442,918, a micro-electro-mechanical system (MEMS) device is disclosed, which utilizes a MEMS process for electroplating double layer planar coils simultaneously on its mirror and out ring relating respectively to the fast scan axis and the slow scan axis so as to enable the fast and the slow scan axes to be actuated by the Lorentz force induced from the interaction between the coils and the permanent magnets disposed at two opposite sides thereof as soon as the coils are charged. Moreover, in U.S. Pat. No. 7,659,918, a single-axis scanning device is disclosed, in which a reflection mirror that is disposed in the middle of the device is actuated to pivotally oscillate or rotate by the use of a piezoelectric material, or by the vibration induced surrounding the reflection mirror. In addition, there is another single-axis scanning device disclosed in U.S. Pat. No. 7,446,919, in that there are four piezoelectric elements being used for actuating a reflection mirror to rotate as the reflection mirror is disposed in the middle of the device.

SUMMARY

The present disclosure related to a high-frequency vibration-actuated micro mirror device with ultra-thin and low-power design, which utilizes a high frequency driving signal and a low frequency driving signal to actuate two vibration structures in respective. Thereby, the two vibration structures, being actuated by the two driving signals, are enabled to generate respectively two vibration wave signals that are to be transmitted to a substrate configured with a fast-axis swinging frame and a slow-axis reflection mirror for enabling the swinging frame and the reflection mirror to resonant and thus to rotate accordingly. Since the pivotally oscillating of the slow-axis reflection mirror can be induced by low-frequency wave signals while the pivotally oscillating of the fast-axis swinging frame can be induced by high-frequency wave signals, a two-dimensional scanning operation can be achieved by the swinging frame and reflection mirror that are being actuated to rotate and thus a specific projection effect can be achieved.

In an exemplary embodiment, the present disclosure provides a vibration-actuated micro mirror device, comprising a substrate, a swinging frame, a reflection mirror, and a vibration part. The substrate having a first accommodating space. The swinging frame is disposed within the first accommodating space and is rotatably coupled to a first peripheral side wall defined the first accommodating space through a first shaft about a first axis, the swinging frame further comprising a second accommodating space. The reflection mirror is disposed within the second accommodating space and is rotatably coupled to a second peripheral side wall defined the second accommodating space through a second shaft about a second axis perpendicular to the first axis. The vibration part further comprises a plate, and a first and a second vibration structures. The plate has a first surface coupled to the substrate, and a second surface opposite to the first surface. The first and a second vibration structures are respectively coupled to the second surface and are spaced a distance away from each other, wherein at least a part of the first and second vibration structures are corresponding to the substrate. The first vibration structure receives a first driving signal having a first frequency and the second vibration structure receives a second driving signal having a second frequency smaller than the first frequency, thereby enabling the swinging frame to rotate about the first axis through twist of the first shaft while enabling the reflection mirror to rotate about the second axis through twist of the second shaft.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
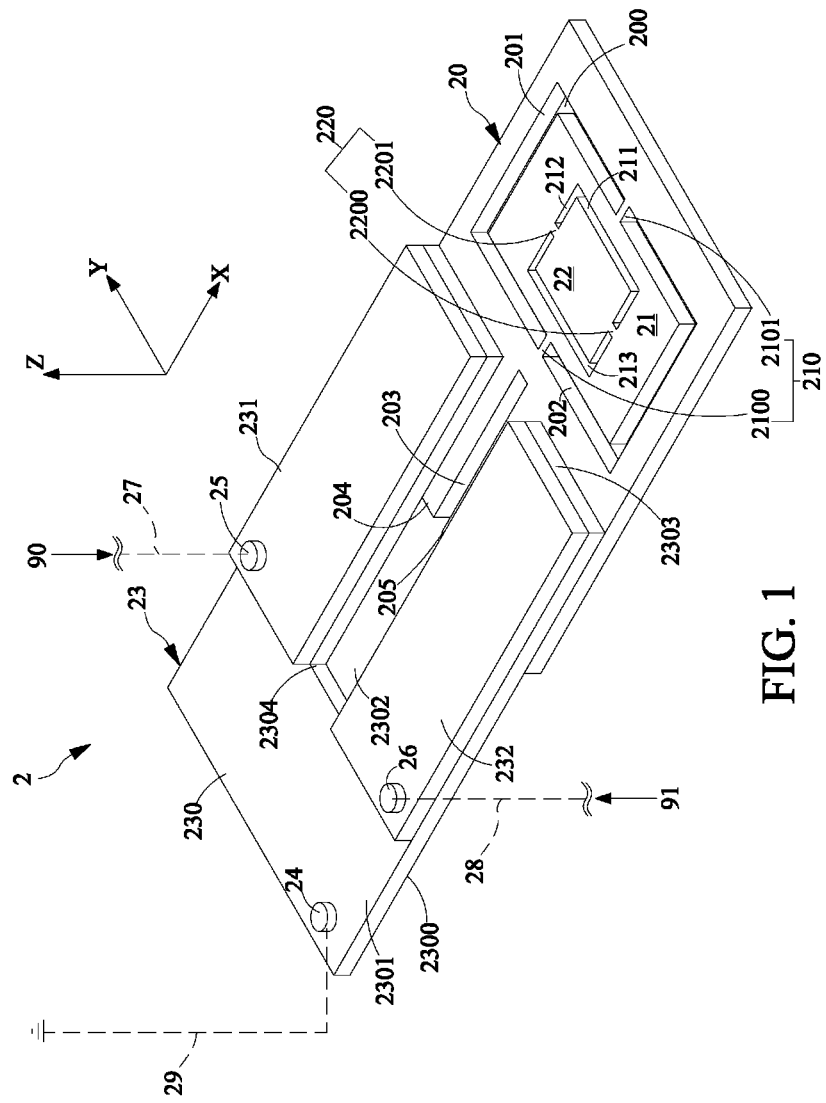
FIG. 1 is a schematic diagram showing a vibration-actuated micro mirror device according to a first embodiment of the present disclosure.

Please refer to FIG. 1, which is a schematic diagram showing a vibration-actuated micro mirror device according to a first embodiment of the present disclosure. In this embodiment, a vibration-actuated micro mirror device 2 includes a substrate 20, a swinging frame 21, a reflection mirror 22, and a vibration part 23. The substrate 20 has a first accommodating space 200 defined by a first peripheral side wall. In the present embodiment, the first peripheral side wall is formed as a rectangular shape, which is formed by two opposite first side walls 201 parallel to a first axis, and two opposite second side walls 202 parallel to a second axis, wherein two ends of each second side wall 202 are respective connected to the two opposite first side walls 201. In this embodiment, the first axis is aligned in X-axis direction and the second axis is aligned in Y-axis direction that the X and Y axes are defined in an XYZ Cartesian coordinate system of FIG. 1. It is noted that the shape formed by the first peripheral side wall should not be limited to the rectangular shape, and it can be changed according to the need.

The swinging frame 21 is disposed within the first accommodating space 200, and is rotatably coupled to the first peripheral side wall defined the first accommodating space 200 through a first shaft 210 about the first axis X. In the present embodiment, the first shaft 210 further has a first subshaft 2100, and a second subshaft 2101 respectively protruding out from two opposite sides of the swinging frame 21 to connect to the two opposite second side walls 202 of the first accommodating space 200. In addition, the swinging frame 21 further has a second accommodating space 211 formed therein for receiving the reflection mirror 22. The second accommodating space 211 is defined by a second peripheral side wall. Likewise, in the present embodiment, the second peripheral side wall is formed as a rectangular shape, which is formed by two opposite third side walls 212 parallel to the first axis X and two opposite fourth side walls 213 parallel to the second axis Y, wherein two ends of each fourth side wall 213 are respective connected to the two opposite third side walls 212. It is noted that the shape formed by the second peripheral side wall should not be limited to the rectangular shape, and it can be changed according to the need.

The reflection mirror 22 is disposed within the second accommodating space 211 and is rotatably coupled to the second peripheral side wall defined the second accommodating space 211 through a second shaft 220 about the second axis Y perpendicular to the first axis X. In the present embodiment, the second shaft 220 further has a third subshaft 2200, and a fourth subshaft 2201 respectively protruding out from two opposite sides of the reflection mirror 22 to connect to the two opposite third sides 212 of the second accommodating space 211.

Figure 2A:
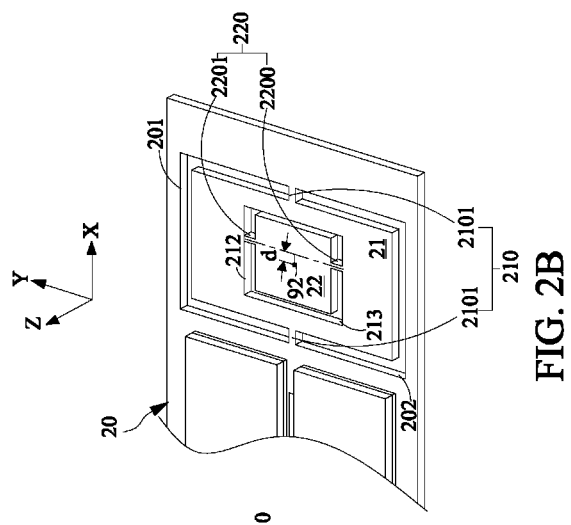
FIG. 2A is a schematic diagram showing the configurations of the pivot axes for the swinging frame and the reflection mirror according to another embodiment of the present disclosure.
Figure 2B:
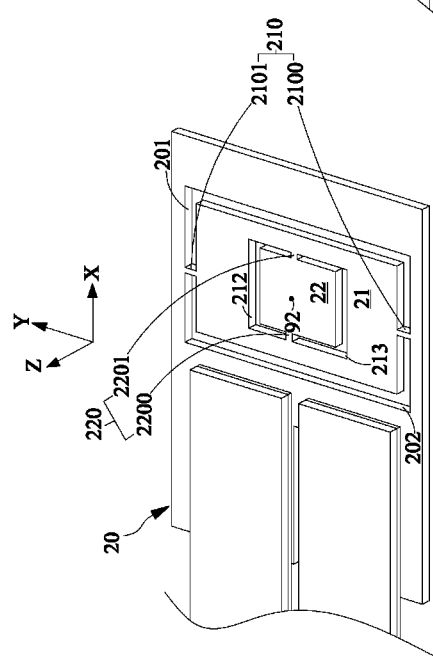
FIG. 2B is a schematic diagram showing that the pivot axis of the reflection mirror is disposed a specific distance away from part from the center of the reflection mirror according to further another embodiment of the present disclosure.

In addition to the arrangement of the first shaft 210 and the second shaft 220 shown in FIG. 1, alternatively, another embodiment illustrates another arrangement of the first shaft 210 and the second shaft 220 is shown in FIG. 2A. In the embodiment that is shown in FIG. 2A, the first shaft 210 of the swinging frame 21 is aligned in the second axis Y and the second shaft 220 of the reflection mirror 22 is aligned in the first axis X that are defined in an XYZ Cartesian coordinate system of FIG. 2A. It is noted that in the embodiments shown in FIG. 1 and FIG. 2A, a center axis of the second shaft 220 is aligned passing through the center 92 of the reflection mirror 22. Alternatively, in the embodiment shown in FIG. 2B, the center axis of the second shaft 220 is aligned a distance d away from the center 92 of the reflection mirror 22.

Figure 3B:
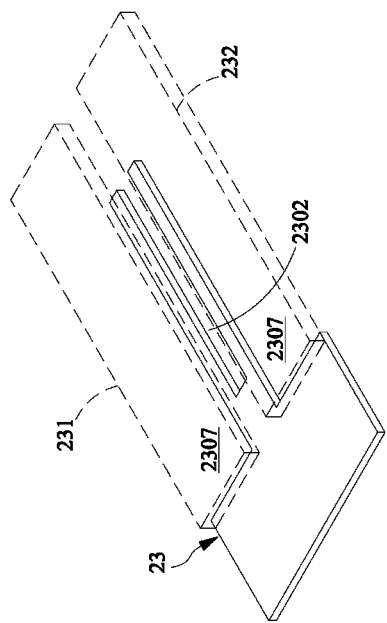
FIG. 3B is a three-dimensional view of the plate having two concaved structures respectively formed at the two lateral side thereof.
Figure 3A:
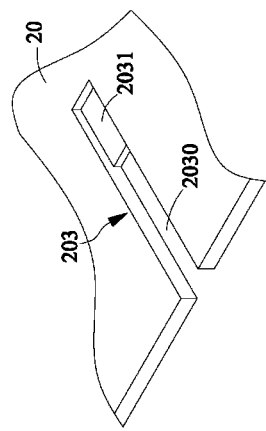
FIG. 3A is a schematic diagram showing a first slot formed on the substrate according to an embodiment of the present disclosure.

Back to the FIG. 1, the substrate 20 is further formed with a first slot 203 at a side of the substrate 20 opposite to the first accommodating space 200. The first slot 203 is arranged to divide the substrate 20 into a first area 204 and a second area 205. It is noted that the first slot 203 can be formed penetrating the substrate 20 in a vertical direction, i.e. in Z-axis direction, or may be a groove without penetrating the substrate 20. Alternatively, as shown in FIG. 3A, the first slot 203 can be composed of a sub-slot 2030 that is formed penetrating the substrate 20, and a sub-groove 2031 that is not penetrating the substrate 20. It is noted that the first slot 203, as the one shown in FIG. 1, is not an essential component for the present disclosure that is can be formed selectively at will according to the material of the substrate 20. Nevertheless, the formation of the first slot 203 is to facilitate the energy of the vibration part 23 to be transmitted to the swinging frame 21 and the reflection mirror 22 for driving the swinging frame 21 and the reflection mirror 22 to rotate accordingly.

Figure 4:
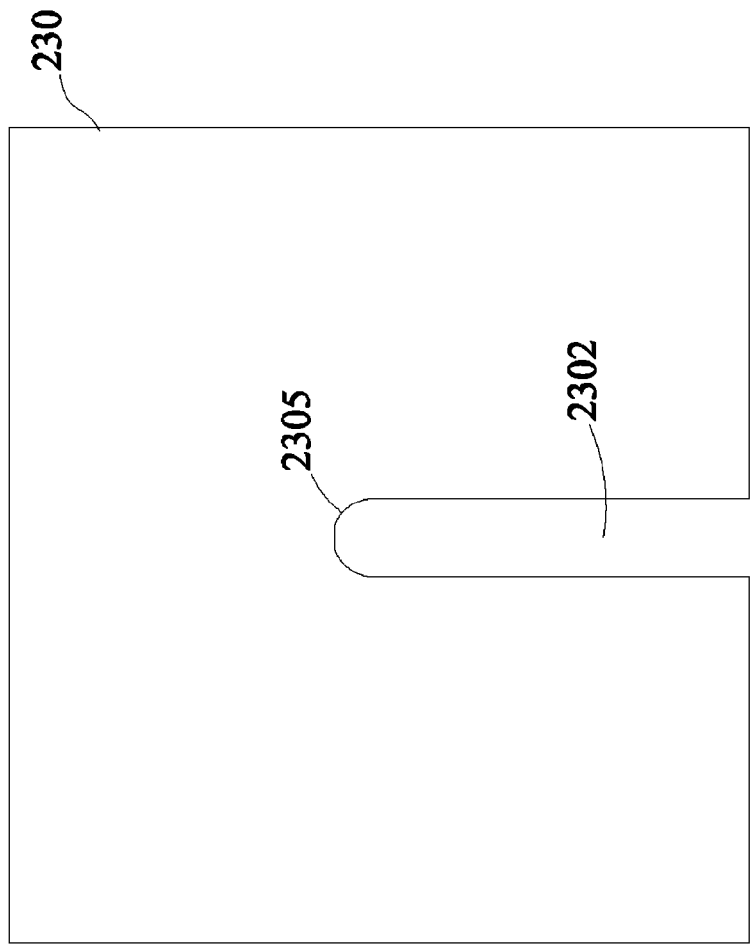
FIG. 4 illustrates a slot formed on the plate of the vibration part according to another embodiment of the present disclosure.
Figure 5A:
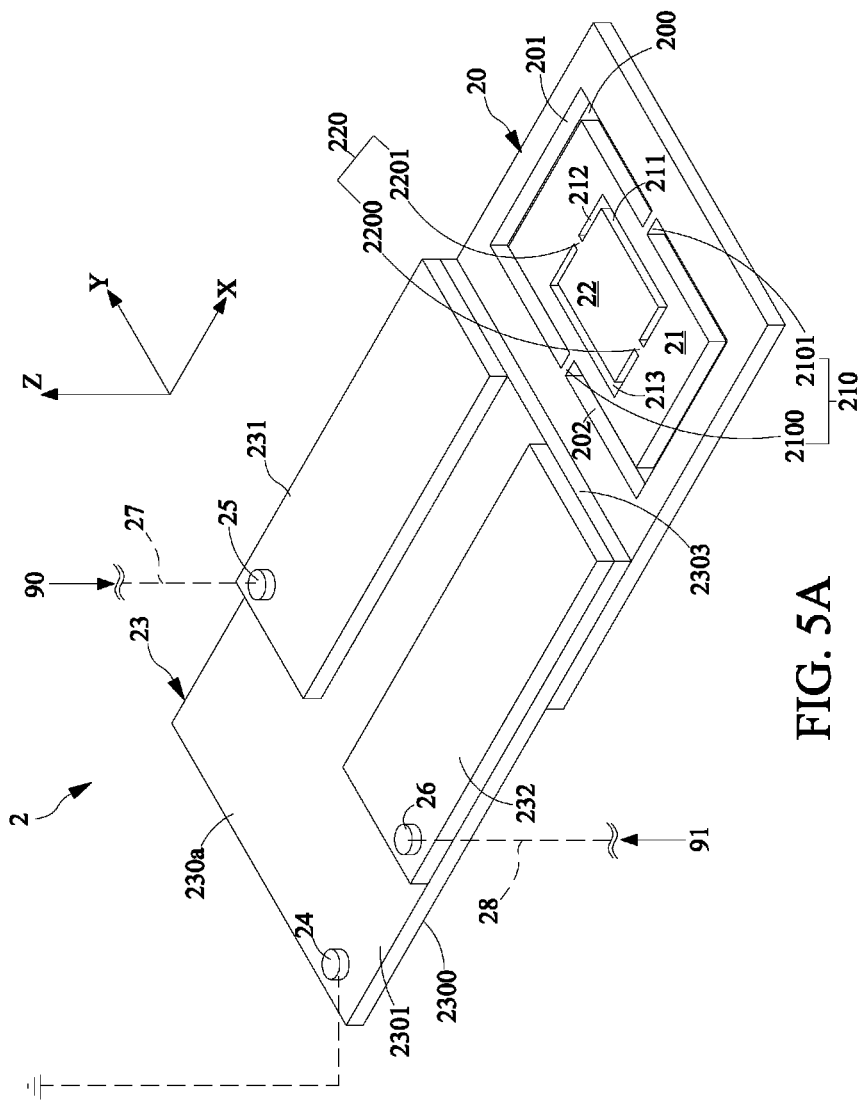
FIG. 5A illustrates a plate according to another embodiment of the present disclosure.

Referring back to FIG. 1, the vibration part 23 further comprises a plate 230, a first vibration structure 231 and a second vibration structure 232. The plate 230 has a first surface 2300 coupled to the substrate 20, and a second surface 2301 opposite to the first surface 2300. It is noted that the plate 230 can be coupled to the substrate 20 by means of adhesive material or other connection ways, which are well-known by the one having ordinary skilled in the art. In one embodiment, the plate 230 can be a metal material having an electrically conductive capability. Alternatively, the plate 230 can also be a non-metal material in which an electrically conductive film is coated on the second surface 2301. The plate 230 further comprises a second slot 2302 having openings communicating with each other and the openings respectively being formed at the first surface 2300, the second surface 2301, and a lateral side wall 2303 in a thickness direction of the plate 230, wherein the thickness direction is a Z-axis direction in the embodiment. It is noted that although a connection area 2304 of inner walls formed the second slot 2302 shown in FIG. 1 has an included angle substantially equal to 90 degree, it should not be a limitation of the second slot 230 of the present disclosure. Alternatively, as shown in FIG. 4, which is a top view of the plate 230, the connection area between the inner walls formed the second slot 2302 has a chamfer structure 2305. It is noted that the second slot 2302 is not an essential component for the present disclosure that is can be formed selectively according to the need. For example, an alternative embodiment shown in FIG. 5A illustrates that the plate 230a is provided without the second slot 2302 shown in FIG. 1.

Referring back to FIG. 1, the first and a second vibration structures 231 and 232 respectively coupled to the second surface 2301 and spaced a distance away from each other, wherein at least a part of the first and second vibration structures 231 and 232 are corresponding to the substrate 20. In the embodiment shown in FIG. 1, the first and the second vibration structures 231, and 232 are respectively coupled to the plate 230 by an end thereof, while enabling another ends of the first and the second vibration structures 231, and 232 to be coupled to the substrate 20 through the plate 230, whereby the first and the second vibration structures 231, and 232 are coupled respectively to the first area 204 and the second area 205 that are divided and formed at two opposite sides of the first slot 203. In addition, the first vibration structure 231 and the second vibration structure 232 are respectively arranged at two sides of the second slot 2302 on the second surface 2301. In one embodiment, a length of the second slot 2302 along the first axis X can be, but should not be limited to, equal to a length of the first and second vibration structures 231 and along the first axis X. The first and second vibration structures 231 and 232 are made of a piezoelectric material, regarded as an active layer, while the plate 230 is a non-piezoelectric material, regarded as an inactive layer, whereby the first vibration structure 231 and the plate 230, and the second vibration structure 232 and the plate 230 can respectively be formed as a unimorph. In the present embodiment, the surface of the first and second vibration structures 231 and 232 are coated with an electrically conductive material having a poling direction substantially the same as each other, wherein the poling direction is vertical to the surface of the first and second vibration structures 231 and 232 defined in XY plane.

Figure 5B:
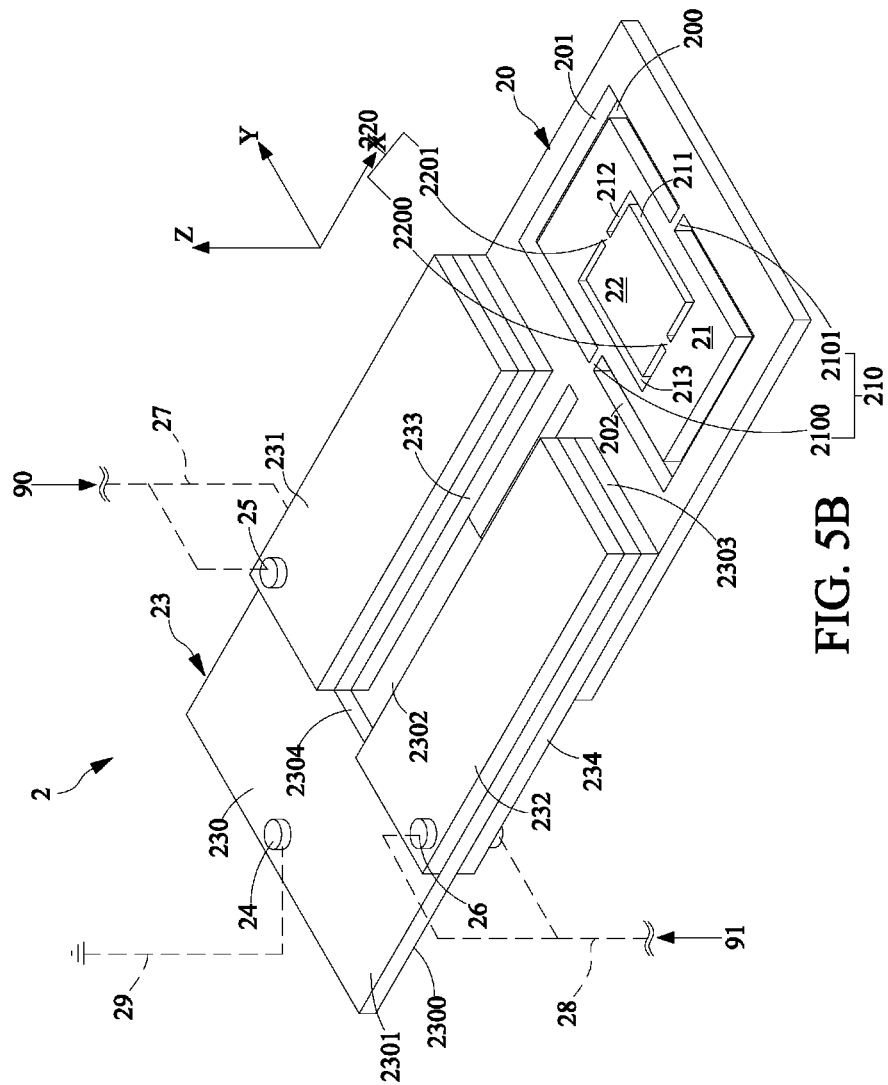
FIG. 5B illustrates vibration structures according to another embodiment of the present disclosure.

In addition to the structure of unimorph, alternative embodiment having bimorph structure is also provided in FIG. 5B. In the embodiment shown in FIG. 5B, there further comprises a third and a fourth vibration structures 233 and 234, wherein the fourth vibration structure 233 is arranged to be coupled to the first surface 2300 of the plate 230 corresponding to the first vibration structure 231, and the substrate 20 while the fourth vibration structure 234 is arranged to be coupled to the first surface 2300 of the plate 230 corresponding to the second vibration structure 232 and the substrate 20. The third and fourth vibration structures 233 and 234 are similar to the first and the second vibration structures 231 and 232, which will not be described hereinafter. In the present embodiment, the plate 230 is sandwiched between the first and the third vibration structures 231 and 233, and between the second and fourth vibration structures 232 and 234, whereby the first vibration structure 231, the plate 230, and the third vibration structure 233 are formed as a first bimorph while the second vibration structure 232, the plate 230, and the fourth vibration structure 234 are formed as a second bimorph.

Figure 6A:
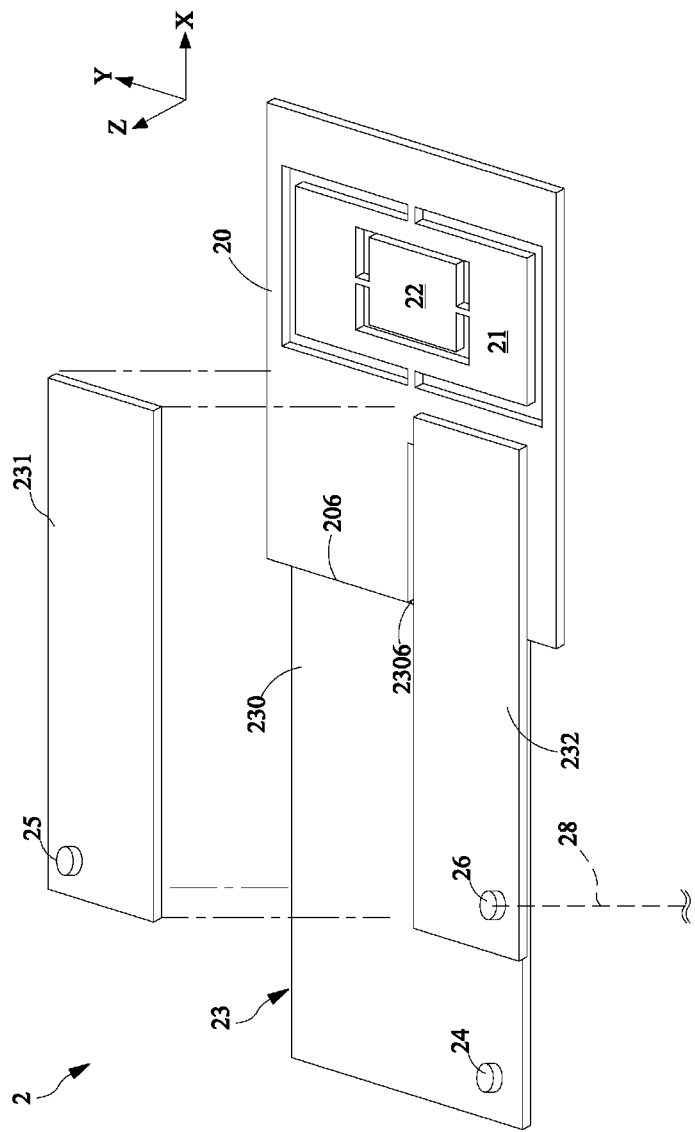
FIG. 6A and FIG. 6B are schematic diagrams showing respectively two vibration-actuated micro mirror devices according to a second embodiment and a third embodiment of the present disclosure.
Figure 6B:
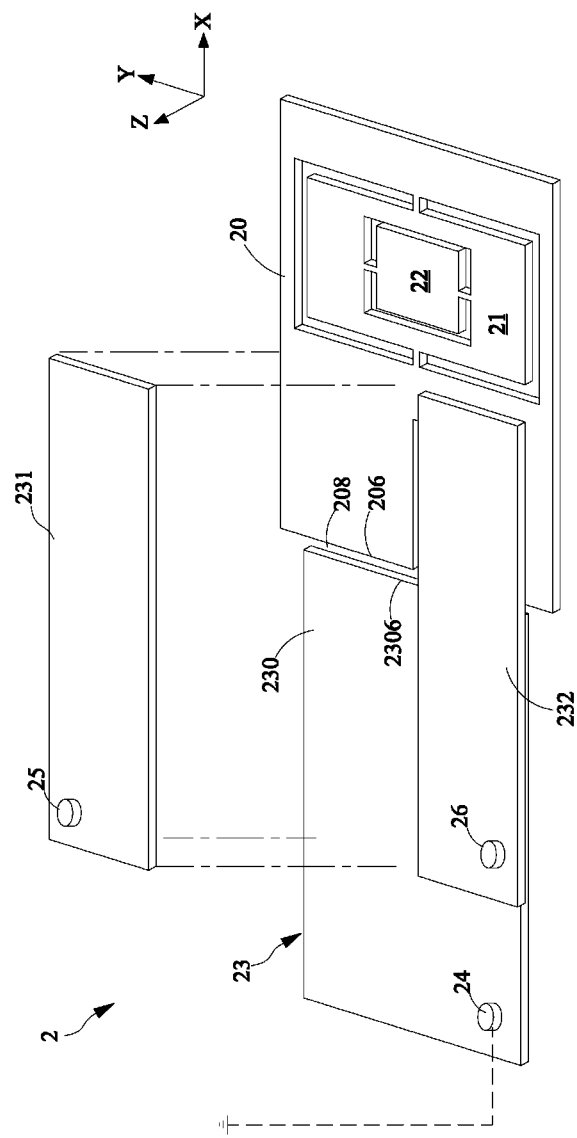

Please refer to FIG. 6A and FIG. 6B, which are schematic diagrams showing respectively two vibration-actuated micro mirror devices according to a second embodiment and a third embodiment of the present disclosure. The embodiment shown in FIG. 6A is basically the same as the one shown in FIG. 1, but is different in that: the first and the second vibration structures 231, and 232 in the second embodiment are coupled directly to the substrate 20 while enabling a side surface 2306 of the plate 230 to abut against a side surface 206 of the substrate 20. Moreover, the embodiment shown in FIG. 6B is basically the same as the one shown in FIG. 1, but is different in that: the first and the second vibration structures 231, 232 are coupled to the substrate 20 directly while enabling a side surface 2306 of the plate 230 to be spaced from a side surface 206 of the substrate 20 by a gap 207. It is noted that although there is no such second slot 2302 being formed on the substrates 20 in FIG. 6A and FIG. 6B as the one shown in FIG. 1. Alternatively, the second slot 2302 shown in FIG. 1 can still be formed in the embodiments of FIG. 6A and FIG. 6B as required in a manner known to those skilled in the art. In addition, the same as the plate 230 shown in FIG. 3B, the two divided areas of the plate 230, that are disposed at two opposite sides of the second slot 2302, can further have concaved areas 2307 formed thereon before mounting the first and the second vibration structures 231, and 232 respectively at positions corresponding to the concaved areas of the plate 230.

The following description relates to how the vibration structures are to be driven to vibrate by taking the vibration-actuated micro mirror device illustrated in FIG. 1 as an exemplary embodiment. It should be noted that, the following operation for driven the vibration-actuated micro mirror device can also be implemented in the embodiments provided the present disclosure.

Please refer to FIG. 1, the first vibration structure 231 is designed to receive a first driving signal 90 having a first frequency and the second vibration structure 232 receives a second driving signal 91 having a second frequency smaller than the first frequency, thereby enabling the swinging frame 21 to rotate about the first axis X through the twist of the first shaft 210 while enabling the reflection mirror 22 to rotate about the second axis Y through the twist of the second shaft 220. In the present embodiment, the plate 230 has a first electrical terminal 24 for being coupled to the ground through signal line 29, while the first vibration structure 231, and the second vibration structure 232 respectively has a second and a third electrical terminals 25 and 26 in which the first electrical terminal 25 is utilized to receive the first driving signal 90 through signal line 27, and the second electrical terminal 26 is utilized to receive the second driving signal 91 through signal line 28. Since one surface of the first and second vibration structures 231 and 232 are respectively electrically coupled to the plate 230 through the electrically conductive material, the plate 230 can be regarded as a common electrode of the first and second vibration structures 231 and 232. It is noted that, for implantation of common electrode through plate 230, if the plate 230 is a metal plate having electrically conductive capability, the electrically conductive material is not a necessary element for implementation of the common electrode. Otherwise, if the plate 230 is a non-metal material without electrically conductively capability, the electrically conductively film formed on the plate 230 is a necessary element for allowing a common electrode to be implemented. Alternatively, in the embodiment shown in FIG. 5B, since the plate 230 is sandwiched respectively by the first and third vibration structures 231 and 233, and the second and fourth vibration structures 232 and 234, the plate 230 can be regarded as the common ground electrode of the first, second, third and fourth vibration structures by coupling the terminal 24 to ground through signal line 29. Meanwhile, the first and third vibration structures 231, and 233 can be coupled together to receive the first driving signal 90 through signal line 27, while the second and fourth vibration structures 232, and 234 can be coupled together to receive the second driving signal 91 through signal line 28.

Figure 7:
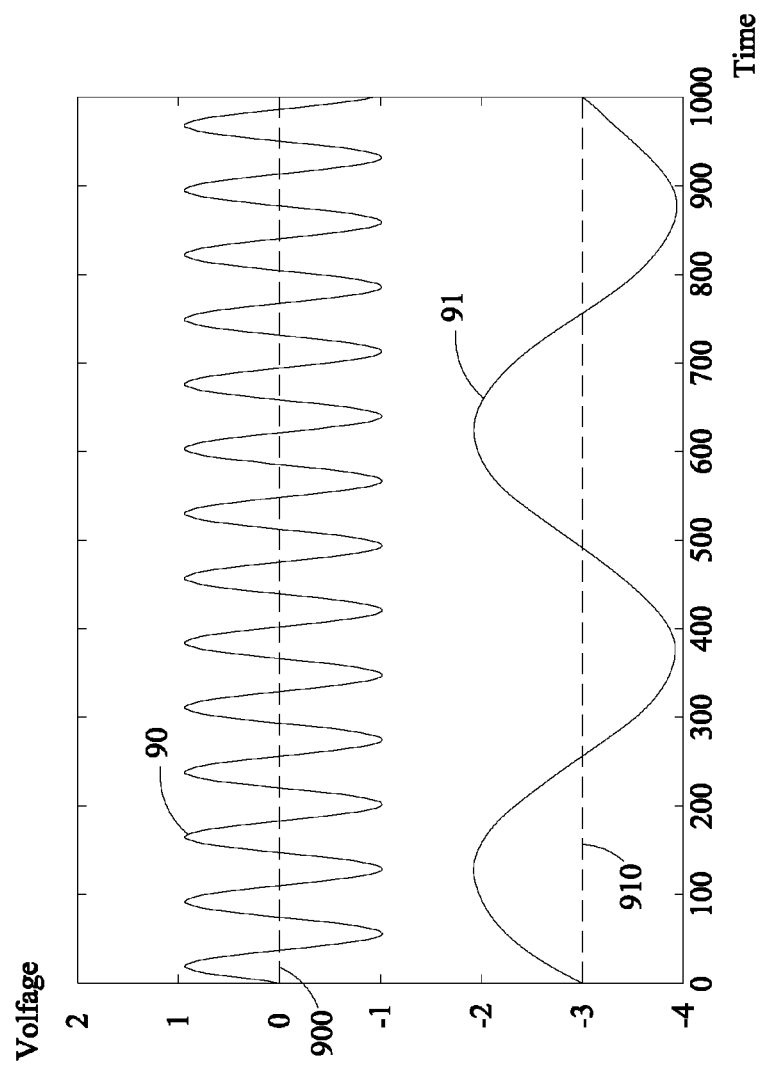
FIG. 7 is a schematic diagram showing two driving signals being received respectively by the first and the second vibration structures according to an embodiment of the present disclosure.

In addition, please refer to FIG. 7 and FIG. 1, which illustrates a schematic diagram showing the first and second driving signals being received respectively by the first and the second vibration structures according to an embodiment of the present disclosure. The first driving signal 90 is used for driving the first vibration structure 231, while the second driving signal 91 is used for driving the second vibration structure 232. It is noted that the frequency of the first driving signal 90, a high frequency signal, is higher than the frequency of the second driving signal, a low frequency signal. Since the first and the second vibration structures 231, and 232 are configured to share the same ground electrode, which is the plate 230 in the present embodiment, whereby the amount of signal lines required can be reduced. The signal lines 27, and 28 are defined to be signal input where the first and second driving signals 90, and 91 are fed respectively to the first and the second vibration structures 231, and 232 for driving the two structures to vibrate accordingly. It is noted that the term "high-frequency" used in the present embodiment is comparative to the term "low-frequency", so that they can be determined at will according to actual requirement.

In FIG. 1, the first vibration structure 231 is driven by a first driving signal 90 so as to generate a first vibration wave while the second vibration structure 232 is driven by a second driving signal 91 so as to generate a second vibration wave. Consequently, by the driving of the first and second driving signals 90, and 91 shown in FIG. 7, the first and second vibration waves will be transmitted to actuate the substrate 20 for enabling the swinging frame 21 to rotate about the first axis X through the twist of the first shaft 210, i.e. a rotation about the slow axis, while enabling the reflection mirror 22 to rotate about a second axis Y through the twist of the second shaft 220, i.e. a rotation about the fast axis. It is noted that, in one embodiment, the frequency of the first driving signal 90 can be, but should not be limited to, more than or equal to 15 KHz, and the frequency of the second driving signal 91 can be, but should not be limited to, less than or equal to 1.5 KHz. It is noted that although, in the foregoing embodiment, the frequency of the first driving signal is larger than the frequency of the second driving signal, alternatively, the frequency of the first driving signal can be smaller than the frequency of the second driving signal.

Figure 8A:
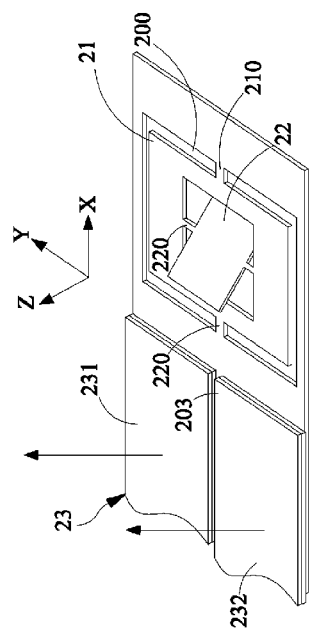
FIG. 8A and FIG. 8B are schematic diagrams showing respectively how the swinging frame and the reflection mirror are being driven to rotate.

The following description relates to how the swinging frame and reflection mirror are to be driven to rotate in the present disclosure that is illustrated by defining the first driving signal is a high frequency signal while the second driving signal is a low-frequency signal, and thus the driving signals are similarly to those shown in FIG. 7. As shown in FIG. 8A, when the first vibration structure 231 receives the first driving signal 90, it generates the first vibration wave with high vibration frequency whereby the reflection mirror 22 is rotated about the second axis, the fast rotation axis, in one direction (for example counterclockwise direction) when the voltage is above the center line 900 of the first driving signal 90 while the reflection mirror is rotated about the second axis in opposite direction (for example clockwise direction) when the voltage is below the center line 900 of the first driving signal 90. It is noted that natural frequency associated with the rotation of the reflection mirror 22 about the second shaft 220 is expressed as below:

$$w_f = \sqrt{\frac{K_f}{I_f}},$$

wherein $I_f$ represents a mass moment of inertia of the reflection mirror 22 with respect to the second axis Y, and $k_f$ represents a torsional stiffness of the second shaft 220 about the second axis Y. It is noted that when the frequency of the first driving signal 90 is close to or substantially the same as the natural resonant frequency of the second shaft 220, a larger rotation angle can be achieved. Accordingly, the twist of the second shaft 220 about the second axis Y is enabled by the contribution of the first driving signal 90.

Figure 8B:
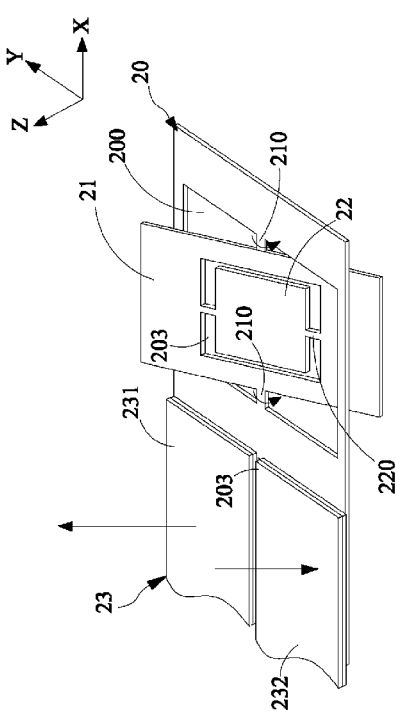

As shown in FIG. 8B, when the second vibration structure 232 receives the second driving signal 91, a low-frequency signal, it generates the second vibration wave with low vibration frequency whereby the swinging frame 21 and the reflection mirror 22 are both rotated about the first axis X, referred to the slow rotation axis, in one direction (for example counterclockwise direction) when the voltage is above the center line 910 of the second driving signal 91 while the swinging frame 21 and the reflection mirror 22 are rotated about the first axis X in opposite direction (for example clockwise direction) when the voltage is below the center line 910 of the second driving signal 91. It is noted that natural frequency associated with the rotation of the swinging frame 21 and the reflection mirror 22 about the first shaft 210 is expressed as below:

$$w_s = \sqrt{\frac{K_s}{I_s}},$$

wherein $I_s$ represents a mass moment of inertia with respect to the combination of swinging frame 21 and the reflection mirror 22 about the first axis X, and $k_s$, represents a torsional stiffness of the first shaft 210 about the first axis X. It is noted that when the frequency of the second driving signal 91 is close to or substantially the same as the natural resonant frequency of the first shaft 210, a larger rotation angle can be achieved. Accordingly, the twist of the first shaft 210 about the first axis X is enabled by the contribution of the second driving signal 91.

By the vibrations of the first and the second vibration structures 231, 232, the twists of the first shaft 210 and the second shaft 220 can be controlled and consequently, the angles of the swinging frame 21 and the reflection mirror 22 are adjusted accordingly so as to achieve a specific scanning operation. It is noted that although the first shaft 210 and second shaft 220 in both the embodiments of FIG. 8A and FIG. 8B are driven to rotate independently, they can be driven to rotate simultaneously, but in a manner that the size of their respective rotation angles as well as the angular difference between the swinging frame 21 and the reflection mirrors 22 are dependent upon their respective driving signals with respect to different frequencies.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A vibration-actuated micro mirror device, comprising:
    a substrate having a first accommodating space;
    a swinging frame, disposed within the first accommodating space and rotatably coupled to a first peripheral side wall defined the first accommodating space through a first shaft about a first axis, the swinging frame further comprising a second accommodating space;
    a reflection mirror, disposed within the second accommodating space and rotatably coupled to a second peripheral side wall defined the second accommodating space through a second shaft about a second axis perpendicular to the first axis; and
    a vibration part further comprising:
        a plate having a first surface coupled to the substrate, and a second surface opposite to the first surface; and
        a first and a second vibration structures respectively coupled to the second surface and spaced a distance away from each other, wherein at least a part of the first and second vibration structures are corresponding to the substrate;
    wherein the first vibration structure receives a first driving signal having a first frequency and the second vibration structure receives a second driving signal having a second frequency smaller than the first frequency, thereby enabling the swinging frame to rotate about the first axis through twist of the first shaft while enabling the reflection mirror to rotate about the second axis through twist of the second shaft.

2. The vibration-actuated micro mirror device of claim 1, wherein a first slot is formed on the substrate for dividing the substrate into a first area coupled to the first vibration structure, and a second area coupled to the second vibration structure.

3. The vibration-actuated micro mirror device of claim 1, wherein the plate is a metal plate.

4. The vibration-actuated micro mirror device of claim 3, wherein the first and the second vibration structures are made of a piezoelectric material whereby the first vibration structure and the plate are combined to be formed as a first unimorph, and the second vibration structure and the plate are combined to be formed as a second unimorph.

5. The vibration-actuated micro mirror device of claim 1, wherein the plate is a non-metal plate having an electrically conductive film coated on the second surface.

6. The vibration-actuated micro mirror device of claim 5, wherein the first and the second vibration structures are made of a piezoelectric material whereby the first vibration structure and the plate are combined to be formed as a first unimorph, and the second vibration structure and the plate are combined to be formed as a second unimorph.

7. The vibration-actuated micro mirror device of claim 1, wherein the plate further comprising a second slot having openings communicating with each other and the openings respectively being formed at the first surface, the second surface, and a lateral side wall in a thickness direction of the plate, wherein the first vibration structure and the second vibration structure are respectively arranged at two sides of the second slot on the second surface.

8. The vibration-actuated micro mirror device of claim 7, wherein a length of the second slot along the first axis is equal to another length of the first and second vibration structures along the first axis.

9. The vibration-actuated micro mirror device of claim 7, wherein a chamfer structure is formed on a connection area between inner walls formed the second slot.

10. The vibration-actuated micro mirror device of claim 1, wherein the second shaft is configured in a manner selected from a group consisting of: a center axis of the second shaft is aligned passing through the center of the reflection mirror, and another center axis of the second shaft is aligned another distance away from the center of the reflection mirror.

11. The vibration-actuated micro mirror device of claim 1, wherein the plate is configured to be a common grounding electrode of the first and the second vibration structures.

12. The vibration-actuated micro mirror device of claim 1, wherein the first surface of the plate corresponding to the first vibration structure further comprises a third vibration structure coupled to the substrate while the first surface of the plate corresponding to the second vibration structure further comprises a fourth vibration structure coupled to the substrate.

13. The vibration-actuated micro mirror device of claim 12, wherein the plate is a metal plate.

14. The vibration-actuated micro mirror device of claim 13, wherein the first, second, third and fourth vibration structures are respectively made of a piezoelectric material whereby the first vibration structure, the third vibration structure and the plate are combined to be formed as a first bimorph, and the second vibration structure, the fourth vibration structure and the plate are combined to be formed as a second bimorph.

15. The vibration-actuated micro mirror device of claim 12, wherein the plate is a non-metal plate having an electrically conductive film coated on the second surface.

16. The vibration-actuated micro mirror device of claim 15, wherein the first, second, third and fourth vibration structures are made of a piezoelectric material whereby the first vibration structure, the third vibration structure and the plate are combined to be formed as a first bimorph, and the second vibration structure, the fourth vibration structure and the plate are combined to be formed as a second bimorph.

17. The vibration-actuated micro mirror device of claim 12, wherein the first driving signal is delivered to the first and third vibration structures while the second driving signal is delivered to the second and fourth vibration structures.

18. The vibration-actuated micro mirror device of claim 1, wherein the first frequency of the first driving signal is more than or equal to 15 KHz.

19. The vibration-actuated micro mirror device of claim 1, wherein the second frequency of the second driving signal is less than or equal to 1.5 KHz.

* * * * *